(12) United States Patent
Taguchi et al.

(10) Patent No.: US 7,130,257 B2
(45) Date of Patent: Oct. 31, 2006

(54) RECORDING/REPRODUCING APPARATUS HAVING A SUBSTITUTING PART SUBSTITUTING FOR BURST ERRORS AND A METHOD OF SUBSTITUTING FOR BURST ERRORS

(75) Inventors: Masakazu Taguchi, Kawasaki (JP); Akihiro Itakura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 463 days.

(21) Appl. No.: 10/620,385

(22) Filed: Jul. 17, 2003

(65) Prior Publication Data

US 2004/0042369 A1 Mar. 4, 2004

(30) Foreign Application Priority Data

Aug. 27, 2002 (JP) ............................. 2002-246841

(51) Int. Cl.
 *G11B 20/10* (2006.01)
(52) U.S. Cl. .............................. 369/59.22; 369/53.35; 369/124.05; 714/762

(58) Field of Classification Search ................. None
See application file for complete search history.

(56) References Cited

U.S. PATENT DOCUMENTS

2002/0097815 A1* 7/2002 Kim et al. .................. 375/340

FOREIGN PATENT DOCUMENTS

| JP | 11-317030 | 11/1999 |
| JP | 2001-148171 | 5/2001 |

* cited by examiner

*Primary Examiner*—Thang V. Tran
*Assistant Examiner*—Joseph Haley
(74) *Attorney, Agent, or Firm*—Staas & Halsey LLP (57) ABSTRACT

A recording/reproducing apparatus records and reproduces, over a partial response channel, a recording signal produced by encoding data according to a convolutional code and reproduces the data from a reproduction signal by iterative decoding using likelihood information. A burst error detector detects a burst error part in the reproduction signal. A substituting part substitutes, for a sampling value included in the burst error part, a predetermined value according to a detected result of the burst error detector.

11 Claims, 14 Drawing Sheets

RECORDING/REPRODUCING APPARATUS HAVING A SUBSTITUTING PART SUBSTITUTING FOR BURST ERRORS AND A METHOD OF SUBSTITUTING FOR BURST ERRORS

BACKGROUND OF THE INVENTION

1. Field of the Invention

The present invention generally relates to data recording/reproducing apparatuses, and more particularly, to a data recording/reproducing apparatus having a substituting part substituting for a burst error and to a method of substituting for a burst error.

2. Description of the Related Art

Apparatuses that record and reproduce data include various recording/reproducing apparatuses, such as recording/reproducing apparatuses of magnetic disks, magnetic tapes, optical disks, magnetic optical disks, and the like. In order to record data on such media, magnetic recording marks are mainly used. It is possible to save data permanently and at lower cost than semiconductor memories by magnetic recording. Nowadays, recording/reproducing apparatuses are essential as information recording apparatuses for computers, for recording such as images and image information having a lot of information.

Figure 1:
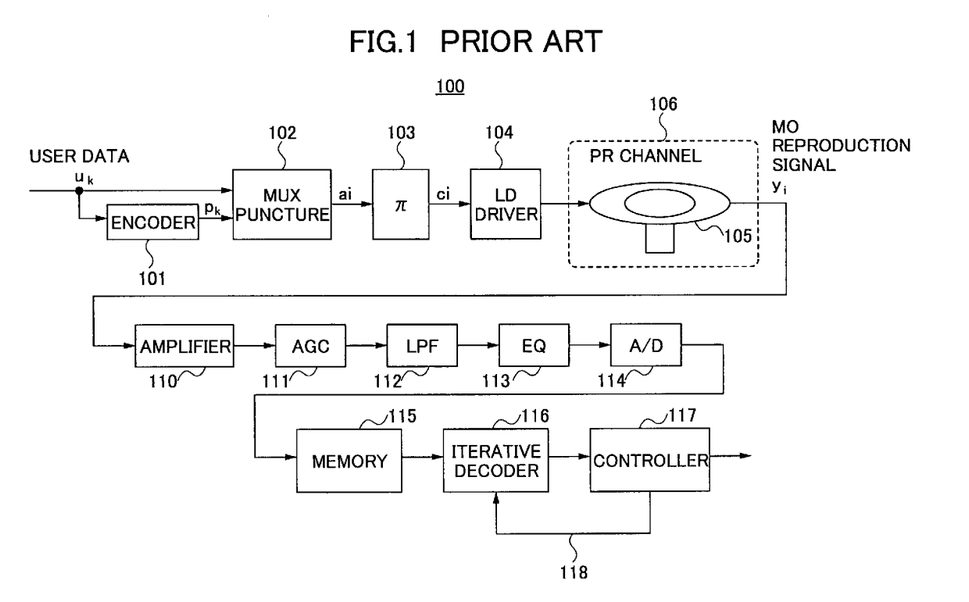
FIG. 1 is a block diagram showing the construction of a conventional data recording apparatus using iterative decoding.

FIG. 1 shows the construction of a conventional data recording apparatus.

First, a description will be given of a case where data are recorded. User data $U_k$ are input to an encoder 101 that modulates the user data $U_k$ to codes that can be iteratively decoded. Then, data interleaved via a puncture part (MUX puncture) 102 and an interleaver ($\pi$) 103 are supplied to an LD driver 104. The LD driver 104 modulates a laser beam based on the supplied data and records the data on an information recording medium 105. In an example shown in FIG. 1, a magnetic optical disk is used as the information recording medium 105 (hereinafter referred to as the "magnetic optical disk 105"). However, a magnetic disk, an optical disk, and other information recording media may also be used. In the case of a magnetic disk, the data are supplied to a magnetic head suitable for the recording medium.

Next, a description will be given of a case where data are reproduced from the magnetic optical disk 105. Recording marks are reproduced from the magnetic optical disk 105 by a head and a MO reproduction signal is obtained. A recording/reproducing system 106 constructed by a writing head, the magnetic optical disk 105, and the reproducing head forms a partial response channel (PR channel) having characteristics such as PR (1, 1). The reproduced MO reproduction signal is amplified by an amplifier 110. Then, the amplitude of the signal is controlled by an AGC 111, and thereafter waveform equalization is performed on the signal by a low-pass filter (LPF) 112 and an equalizer (EQ) 113. The MO reproduction signal Yi subjected to waveform equalization as described above is converted to a digital signal by an A/D converter 114 by using a clock synchronized with the reproduction signal. Then, the digital signal thus converted is accumulated in a memory 115.

Next, based on the data accumulated in the memory 115, the user data are reproduced by a iterative decoder 116 such as a turbo decoder. The iterative decoder 116 is controlled by a controller 117 (for example, an ODC in the case of a magnetic optical disk apparatus). The iterative decoder 116 decodes the user data through iterative decoding of the number of times determined by the controller 117.

Figure 2:
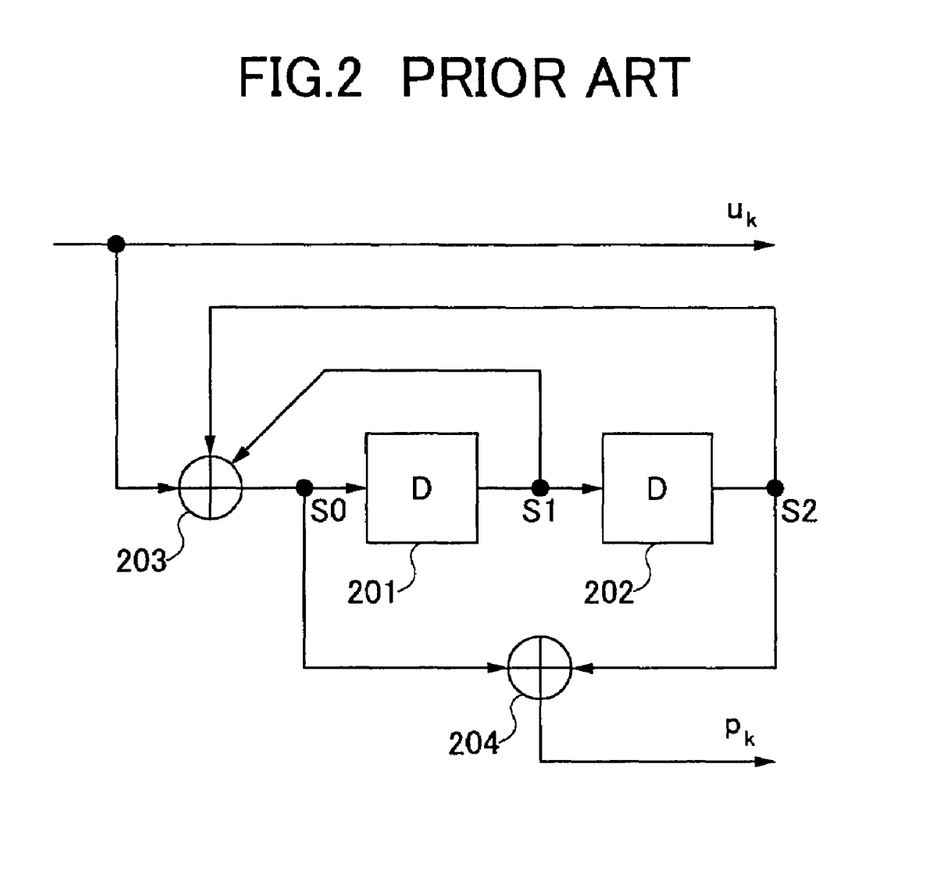
FIG. 2 is a block diagram showing an example of the construction of an encoder that encodes user data to codes for performing iterative decoding.

FIG. 2 shows an example of the encoder 101 that encodes the user data into codes for performing iterative decoding. The encoder shown in FIG. 2 is an iterative convolutional encoder and is constructed by registers 201 and 202, and exclusive ORs 203 and 204. The encoder shown in FIG. 2 generates a parity sequence $p_k$ from the user data sequence $U_k$.

Figure 3:
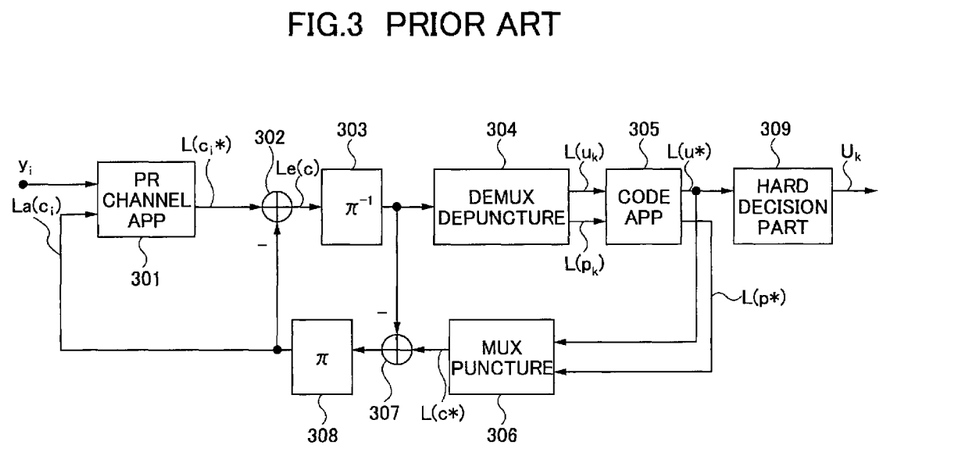
FIG. 3 is a block diagram showing an example of a conventional construction of the iterative decoder shown in FIG. 1.

FIG. 3 shows an example of a conventional construction of the iterative decoder 116 in FIG. 1. Data (a reception signal sequence) $y_i$ represent a reception signal digitized by the A/D converter 114 and accumulated in the memory 115 shown in FIG. 1. The sampling data $y_i$ are supplied to an a posteriori probability decoder (PR Channel APP) 301. The a posteriori probability decoder 301 calculates, under the condition where input sampling value Y ($y_1, y_2, y_3, \ldots y_n$) is detected, a logarithmic likelihood ratio $L(c_i^*)$ between the probability P (ci=1|y) that the next input bit ci is "1" and the probability P (ci=0|y) that ci is 0. When iteration is made for the first time, a priori information $La(c_i)$ input to the a posteriori probability decoder 301 is all zeros. This represents that the probability that all of the bits ci are "1" and the probability that all of the bits ci are "0" are the same probability (are equal).

Then, the a priori information $La(c_i)$ is subtracted from $L(c_i^*)$, which is the output of the a posteriori probability decoder 301, by a subtractor 302 so as to obtain extrinsic likelihood information Le(c). The extrinsic likelihood information Le(c) is converted by a deinterleaver 303 and thereafter sent to a depuncture part 304. The depuncture part 304 converts the deinterleaved extrinsic likelihood information Le(c) to likelihood information $L(u_k)$ corresponding to a data bit $U_k$ and likelihood information $L(P_k)$ corresponding to a parity bit $P_k$ and supplies the information to a code decoder (Code APP) 305. The code decoder 305 outputs a logarithmic likelihood ratio L(u*) with respect to the data bit $u_k$ and a logarithmic likelihood ratio L(p*) with respect to the parity bit $p_k$ from $L(u_k)$ and $L(p_k)$, respectively. When performing iterative decoding, L(u*) and L(p*) are sent to a puncture part 306 and converted to likelihood information L(c*)(the result of combining and thinning out L(u*) and L(p*)). A priori information Le(c) is subtracted from L(c*) by a subtractor 307. Then, interleaving is performed by an interleaver 308 on the output of the subtractor 307 so as to obtain $La(c_i)$. $La(c_i)$ is supplied to the a posteriori probability decoder (PR Channel APP) 301 as a priori information and iteration is repeatedly performed. Data detection is performed such that a hard decision part 309 determines whether L(u*) obtained from the code decoder 305 is "1" or "0" and outputs the user data sequence $U_k$.

However, the above-described conventional example suffers from the following problems.

Generally, there are local defects in recording media such as optical disks (including magnetic optical disks), magnetic disks, and magnetic tapes. Especially, in optical disks and magnetic tapes that are replaceable media, defective parts are increased by the influence of adhesion of dust and scratches made when handling them. The iterative decoding described above operates very effectively for reduced SNR associated with recording media and apparatuses of higher density. When a reproduction signal (burst error signal) of a defective part in a recording medium is input, however, likelihood information that is made vastly different via a priori information is propagated to data of a part(s) other than the burst error part, and an error in the burst error part is propagated to the data of the other part(s). This is because the likelihood information obtained from the data of the burst error part is greatly different from the likelihood information obtained from the original data. Hence, there is a problem in that the effect of error correction by iterative decoding cannot be obtained sufficiently.

SUMMARY OF THE INVENTION

It is a general object of the present invention to provide an improved and useful data recording/reproducing apparatus and method in which the above-mentioned problems are eliminated.

It is another and more specific object of the present invention to provide a data recording/reproducing apparatus using iterative decoding and capable of correctly demodulating data even in a case where a reproduction signal includes a burst error signal, that is, capable of adequately obtaining the effect of error correction by iterative decoding.

In order to achieve the above-mentioned objects according to one aspect of the present invention, there is provided a recording/reproducing apparatus that records and reproduces, over a partial response channel, a recording signal produced by encoding data according to a convolutional code and reproduces the data from a reproduction signal by iterative decoding using likelihood information, the recording/reproducing apparatus including:

a burst error detector detecting a burst error part in the reproduction signal; and a substituting part substituting, for a sampling value included in the burst error part, a predetermined value according to a detected result of the burst error detector.

According to the present invention, by detecting a burst error part and substituting, for the burst error part, a value that does not exert influence on a part(s) other than the burst error part, it is possible to control the influence of wrong likelihood information in iterative decoding. Thus, it is possible to maintain the decoding ability of iterative decoding.

As described above, according to the present invention, wrong likelihood information is not propagated even if a reproduction signal includes a burst error part. Hence, it is possible to obtain a recording/reproducing apparatus having high decoding ability even with low S/N ratios by iterative decoding.

Other objects, features and advantages of the present invention will become more apparent from the following detailed description when read in conjunction with the following drawings.

DETAILED DESCRIPTION OF THE PREFERRED EMBODIMENTS

A description will be given of preferred embodiments of the present invention.

Figure 4:
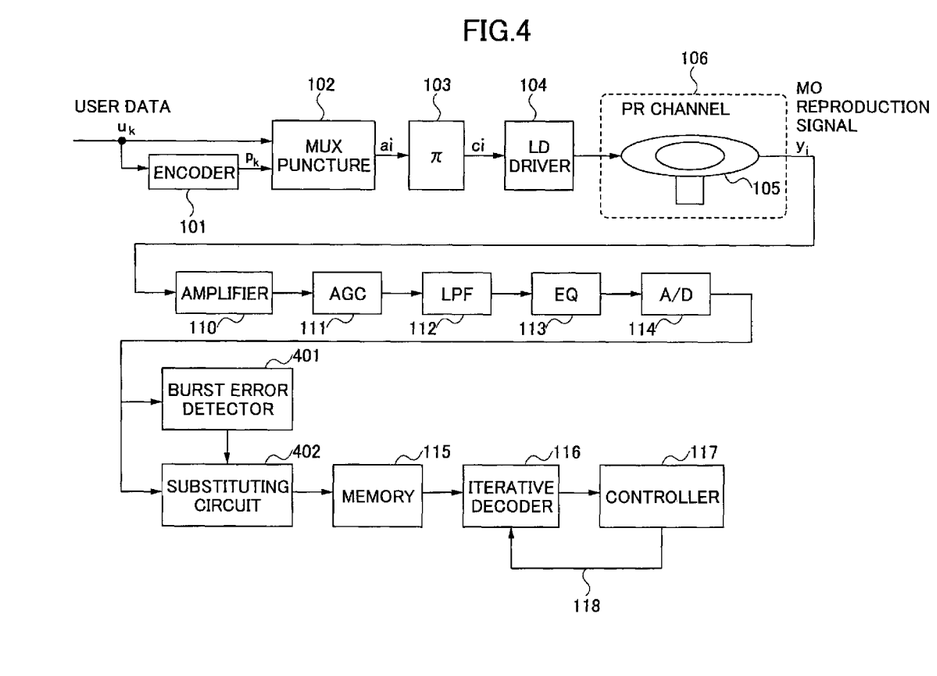
FIG. 4 is a block diagram showing a first embodiment of the present invention.

FIG. 4 shows a first embodiment of the present invention. The first embodiment of the present invention shown in FIG. 4 differs from the recording/reproducing system of optical disks using conventional iterative decoding shown in FIG. 1 in that a burst error detector 401 as burst detecting means and a substituting circuit 402 as substituting means are provided in the first embodiment shown in FIG. 4. Fundamental recording and reproducing of data in the first embodiment are the same as those explained with reference to FIG. 1.

In the first embodiment shown in FIG. 4, the A/D converter 114 converts the MO reproduction signal subjected to waveform equalization into digital data, and, from this value, the burst error detector 401 detects a burst error region from the value. Then, the substituting circuit 402 substitutes, for the data corresponding to the burst error part, likelihood information that does not affect (that hardly propagates the error to) data of parts other than the burst error part when iterative decoding is performed by the iterative decoder 116. The data whose value in the burst error part is substituted for are accumulated in the memory 115. The data are substituted for with likelihood information representing that the probability of "1" and the probability of "0" are the same probabilities. For example, in a case where highest likelihood information of probability that data are "1" (lowest likelihood information of probability that data are "0") is +1, and lowest likelihood information of probability that data are "1" (highest likelihood information of probability that data are "0") is −1, the data to be substituted for are replaced by the intermediate value "0" of likelihood information. Hence, it is possible to exert the least influence of the burst error part on parts other than the burst error part. In this manner, the iterative decoder 116 performs iterative decoding on the data accumulated in the memory 115, including the data in the burst error part whose values are substituted. It should be noted that the reason for accumulating data in the memory 115 is that the iterative process of the iterative decoder 116 is an operation having a lower rate than the channel transfer rate. Moreover, another reason is that, in iterative decoding, it is necessary to perform a backward operation with respect to pathmetric. In some cases, the memory 115 may not be required depending on the execution method of the following iterative decoding.

Figure 5:
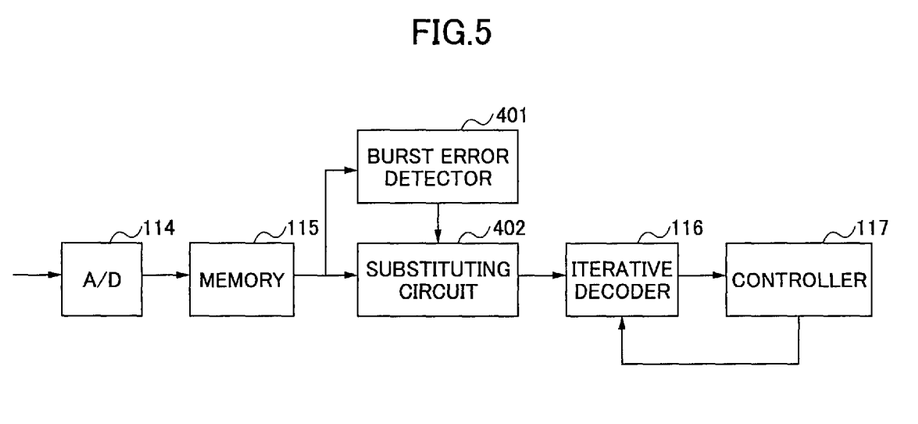
FIG. 5 is a block diagram showing a second embodiment of the present invention.

Next, FIG. 5 shows a second embodiment of the present invention. In this embodiment, the MO reproduction signal subjected to waveform equalization is converted to a digital signal by the A/D converter 114, and thereafter the digital value is temporarily accumulated in the memory 115. Then, using the accumulated values, a burst error is detected by the burst error detector 401, and the substitution of data is performed by the substituting circuit 402. The data to be substituted are the same as those in the first embodiment shown in FIG. 4.

In this embodiment, while reading the data from the memory 115, the read data are substituted and then supplied to the iterative decoder 116. It is possible to replace burst error data in this manner.

Figure 6:
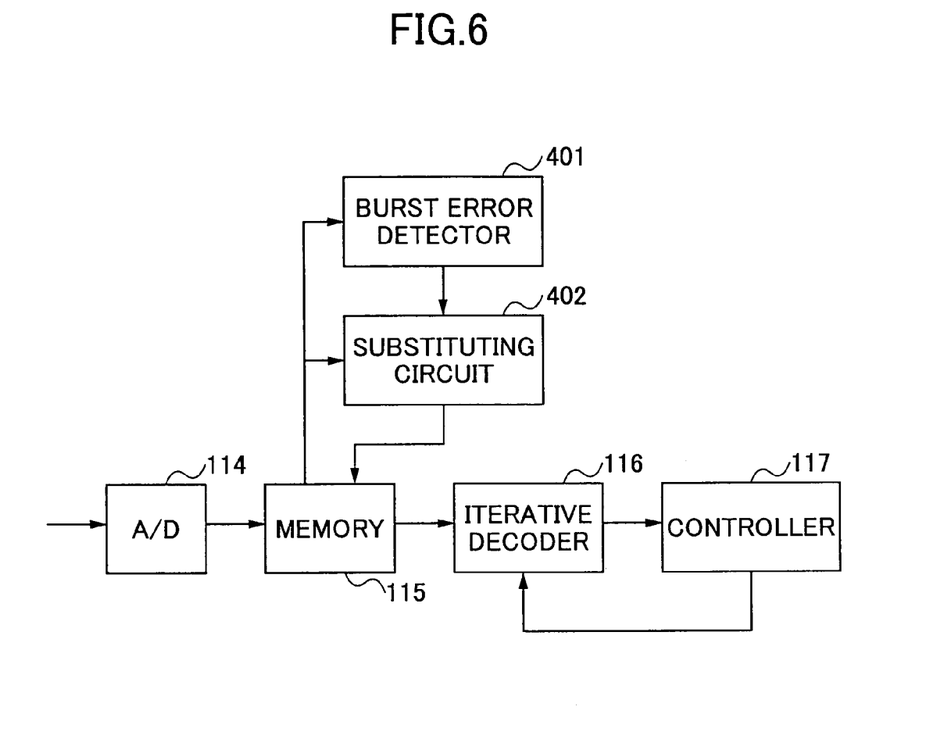
FIG. 6 is a block diagram showing a third embodiment of the present invention.

FIG. 6 shows a third embodiment of the present invention. In this embodiment, while reading the data from the memory 115, a burst error is detected by the burst error detector 401, the read data are substituted by the substituting circuit 402, and then the data are written again in the memory 115. The data to be substituted are the same as those in the first embodiment shown in FIG. 4. It is possible to substitute the data in the memory 115 in this manner.

Figure 7:
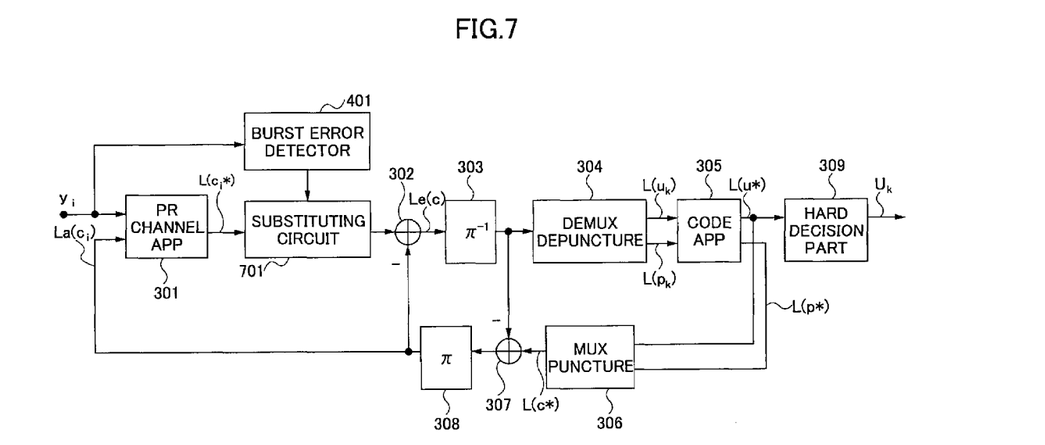
FIG. 7 is a block diagram showing a fourth embodiment of the present invention.

FIG. 7 shows a fourth embodiment of the present invention. In FIG. 7, those parts that are designated by the same reference numerals in FIG. 3 are the same as those corresponding parts in FIG. 3. In this embodiment, the output of the a posteriori probability decoder (PR Channel APP) 301 is substituted for. In FIG. 7, using the data output from the memory 115, which data are the input to the a posteriori probability decoder 301, a burst error position is detected by the burst error detector 401, and the output of the a posteriori probability decoder 301 is replaced by the substituting circuit 701. It is possible to substitute for burst error data in this manner. The data to be replaced are substituted for with likelihood information representing that the probability of "1" and the probability of "0" are the same probability. For example, in a case where highest likelihood information of probability that data are "1" (lowest likelihood information of probability that data are "0") is "+1", and lowest likelihood information of probability that data are "1" (highest likelihood information of probability that data are "0") is "−1", the data are replaced with the intermediate value "0" of likelihood information. Hence, it is possible to exert the least influence of the burst error part on parts other than the burst error part.

Figure 8:
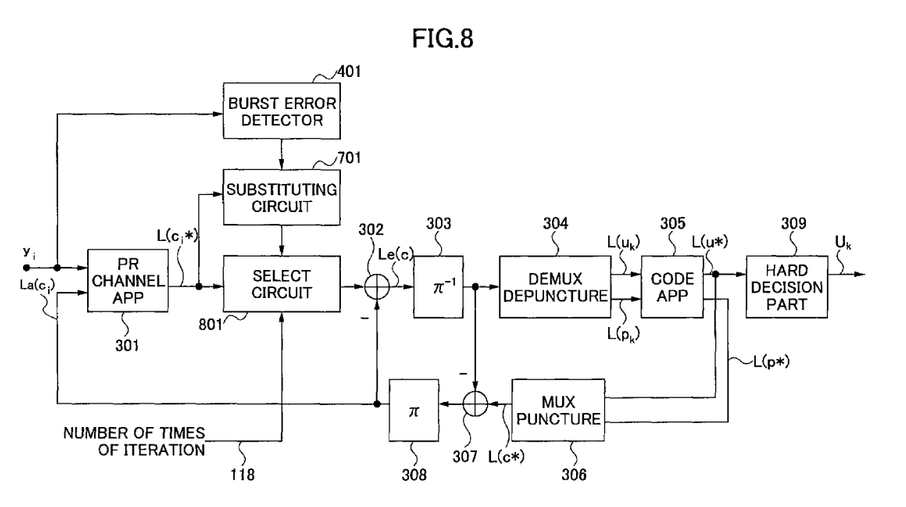
FIG. 8 is a block diagram showing a fifth embodiment of the present invention.

Next, a description will be given of a fifth embodiment of the present invention. FIG. 8 shows the fifth embodiment of the present invention. In the embodiment shown in FIG. 8, those parts that are designated by the same reference numerals in the fourth embodiment shown in FIG. 7 are the same as those corresponding parts in FIG. 7. The fifth embodiment of the present invention shown in FIG. 8 differs from the fourth embodiment of the present invention shown in FIG. 7 in that a select circuit 801 is provided in the fifth embodiment.

In the initial stage of iterative decoding, such as the number of times of iteration is one and two, likelihood information of the PR channel corresponding to the burst error part exerts great influence on likelihood information of parts other than the burst error part. In order to control this, in this embodiment, based on control information 118 of the number of times of iteration supplied to the iterative decoder 116 from the controller 117 shown in FIG. 1, whether to select and send, to the subtractor 302, $L(c_i^*)$ that is output from the a posteriori probability decoder 301 or to select and send, to the subtractor 302, the output of the substituting circuit 701 is controlled in accordance with the number of times of iterative decoding.

Figure 9:
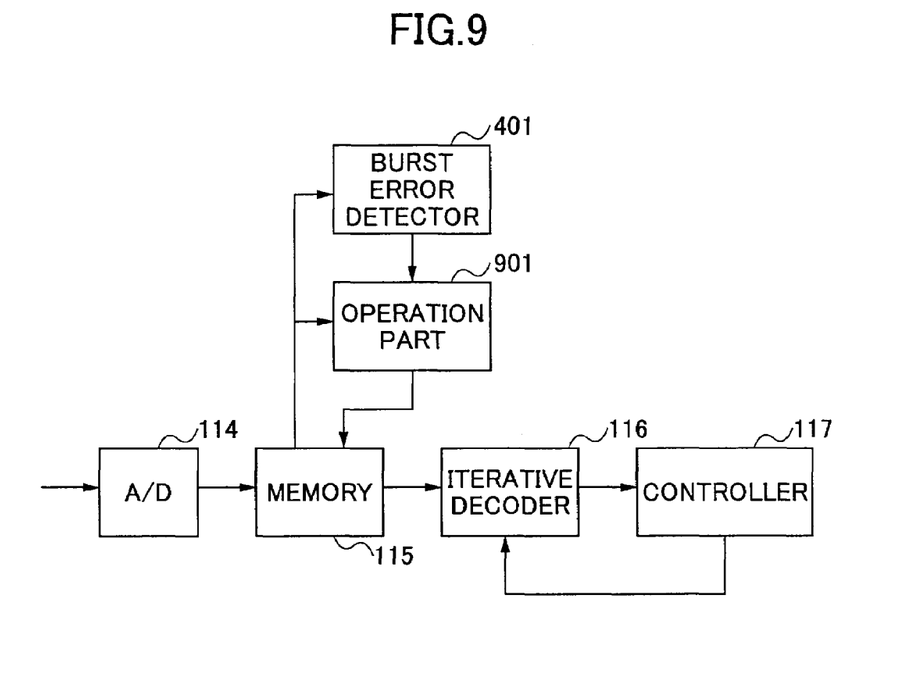
FIG. 9 is a block diagram showing a sixth embodiment of the present invention

Next, a description will be given of a sixth embodiment of the present invention. FIG. 9 shows the sixth embodiment of the present invention. In this embodiment, data of a burst error part and vicinity are replaced through performing a predetermined operation by an operation part 901 with respect to the data accumulated in the memory 115 and corresponding to the burst error part and vicinity detected by the burst error detector 401.

Figure 10:
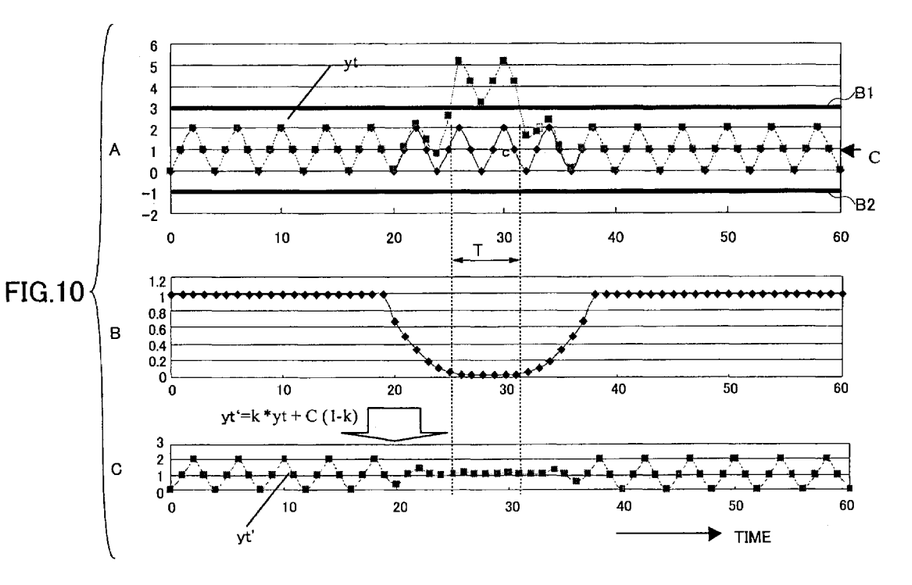
FIG. 10 is a timing diagram showing an operation example of a burst error waveform.

FIG. 10 shows one embodiment of the operation with respect to a burst error waveform. FIG. 10-A represents a reproduction waveform of a burst error part, FIG. 10-B represents an operation coefficient k, and FIG. 10-C represents the waveform after the operation by the operation part 901. In FIG. 10-A, yt indicates each sampling value, a time period T indicates the burst error part, B1 indicates a threshold value on the positive side of a burst error detection level, B2 indicates a threshold value on the negative side of the burst error detection level, and C indicates the center value. The operation of the operation part 901 is performed according to:

$$yt'=k*yt+C(1-k) \qquad (1)$$

where yt' is the sampling value after the operation.

First, the burst error detector 401 shown in FIG. 9 reads the accumulated data from the memory 115 and detects the burst error part T. Then, with a central focus on the range of the burst error part, the sampling value is calculated according to the equation (1) by using the operation coefficient k represented by FIG. 10-B. For example, in FIG. 10-A, when the sampling value yt has an amplitude greater than the threshold value B1 in the time period 25-32, the burst error detector 401 detects that a burst error part due to scratches of dust exists. Usually, the influence of such as scratches is exerted also on parts before and after the burst error part. Therefore, while reading the data from the memory 115, the operation coefficient k is varied as indicated by FIG. 10-B, including the parts before and after the burst error part T.

When the operation is executed according to the equation (1) by using the operation coefficient k, as represented by FIG. 10-C, the amplitude of the signal of the burst error part becomes small and assumes values close to the center value C. In the case where the reproduction waveform of FIG. 10-A is the waveform of PR(1, 1), the center value C is a value at which whether data are "1" or "0" cannot be determined. Thus, according to the operation of this embodiment, it is possible to substitute, for the burst error part, likelihood information of the iterative decoding process that does not exert influence on other data.

As described above, in the embodiments of the present invention explained with reference to FIGS. 4 through 10, the values of the burst error part in the sampling values of the MO reproduction waveform digitized by the A/D converter 114 are directly replaced or replaced through the operation, with values that do not exert influence on likelihood information of parts other than the burst error part. That is, the values of the burst error part are replaced by other values in the part corresponding to the PR channel data.

Figure 11:
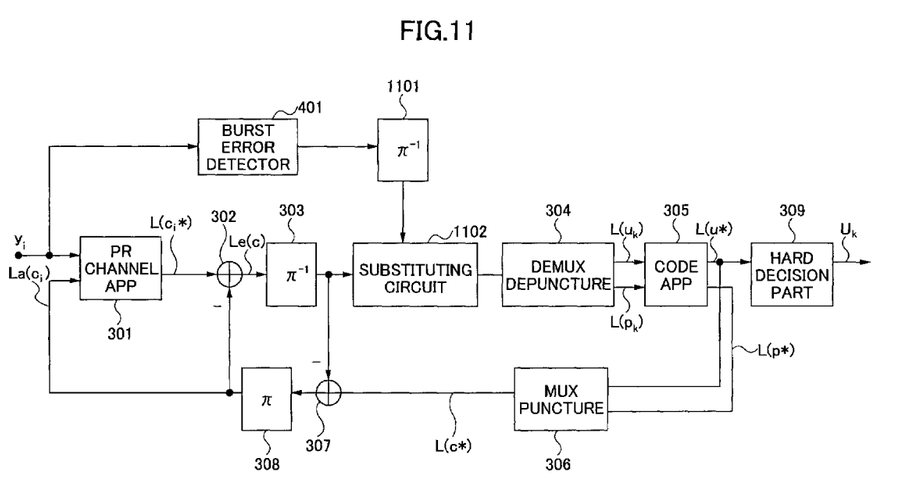
FIG. 11 is a block diagram showing a seventh embodiment of the present invention.

Next, a description will be given of a seventh embodiment of the present invention. FIG. 11 shows the seventh embodiment of the present invention. In this embodiment, those parts that are designated by the same reference numerals in FIG. 7 are the same as those corresponding parts in FIG. 7. This embodiment shows an embodiment where data corresponding to Code data are replaced. In this embodiment, first, a burst error part is detected from the sampling value $y_i$ that is output from the memory 115. Then, deinterleaving is performed by a deinterleaver 1101 on the position of the detected burst error part, and the position corresponding to the burst error part on the PR channel is converted so as to correspond to the output of the deinterleaver 303 and supplied to a substituting circuit 1102 as substituting means.

The substituting circuit 1102 substitutes, for likelihood information of the part corresponding to the burst error part, the deinterleaved extrinsic likelihood information Le(c) output from the deinterleaver 303. In this case, the likelihood information Le(c) is a likelihood information ratio. Thus, if the probability that data are "1" is 100%, then Le(c)=1, and if the probability that data are "0" is 100%, then Le(c)=−1. In addition, if the probability that data are "1" and the probability that data are "0" are the same, then Le(c)=0. Accordingly, the likelihood information Le(c) corresponding to the burst error part is substituted as the value 0. In this manner, by substituting the likelihood information representing that the probability that data are "1" and the probability that data are "0" are same, the influence of the burst error part is not propagated to parts other than the burst error part.

Figure 12:
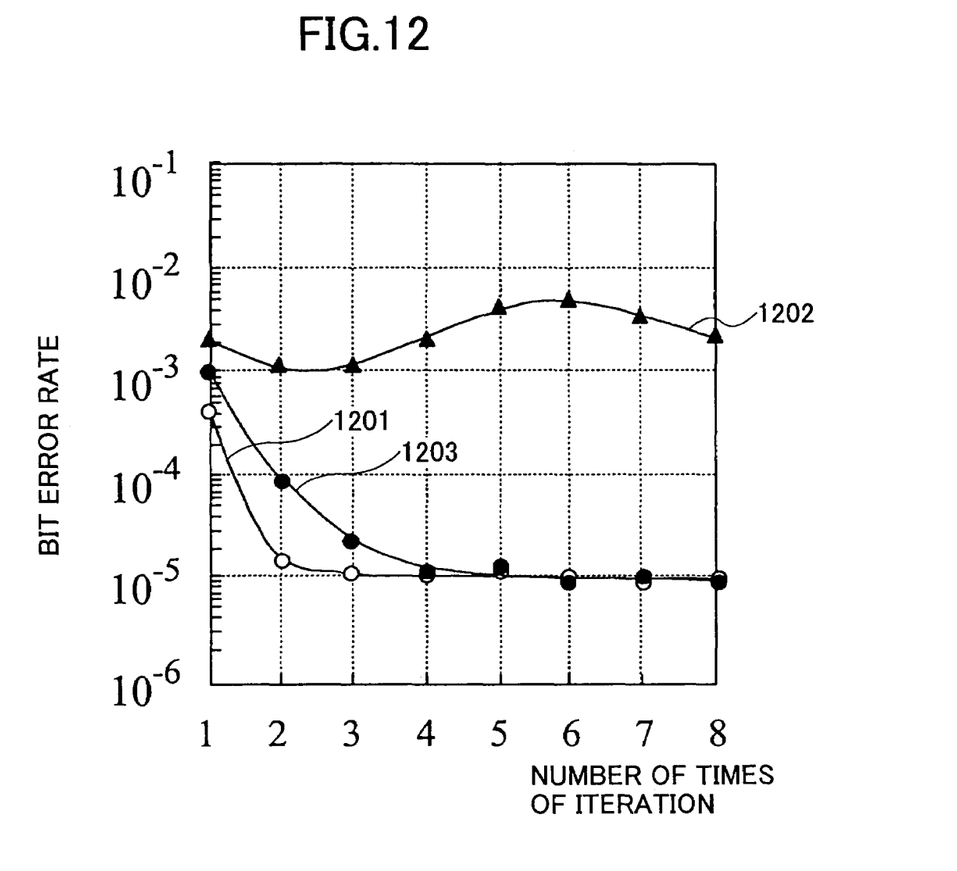
FIG. 12 is a graph showing simulation results of the error rate with respect to the number of times of iteration of iterative decoding using the present invention.

Next, a description will be given of simulation results of the error rate with respect to the number of times of iteration of the iterative decoding according to the present invention, in a case where a burst error part was generated. FIG. 12 shows the simulation results of the error rate with respect to the number of times of iteration of iterative decoding using the present invention. In a result 1201 of the case where a burst error part did not exist, the error rate at the beginning of the iterative decoding starts from $4.0 \times 10^{-4}$, and as the number of times of iteration increases, the error rate falls. Then, in the third iteration of decoding, the error rate is stabilized at $1.0 \times 10^{-5}$.

On the other hand, in a result 1202 of the case where data of a burst error part were not replaced, the error rate does not fall in accordance with the increase of the number of times of iteration. This is because wrong likelihood information of the burst error part was propagated to parts other than the burst error part. Thus, the error rate fluctuated.

In a result 1203 of the case where data of the burst error part were replaced according to the present invention, compared with the result 1201 of the case where the burst error part did not exist, a greater number of times of iteration is required for convergence. As the number of times of iteration of the iterative decoding increases, however, the error rate falls. In the fourth iteration of decoding, the error rate reaches an equivalent error rate of the result 1201 of the case where the burst error part did not exist.

As described above, with the iteration decoding method according to the present invention, it is possible to obtain a system that does not propagate wrong likelihood information to parts outside of the burst error part and, by iterative decoding, possesses high decoding ability even for low S/N ratios.

Figure 13:
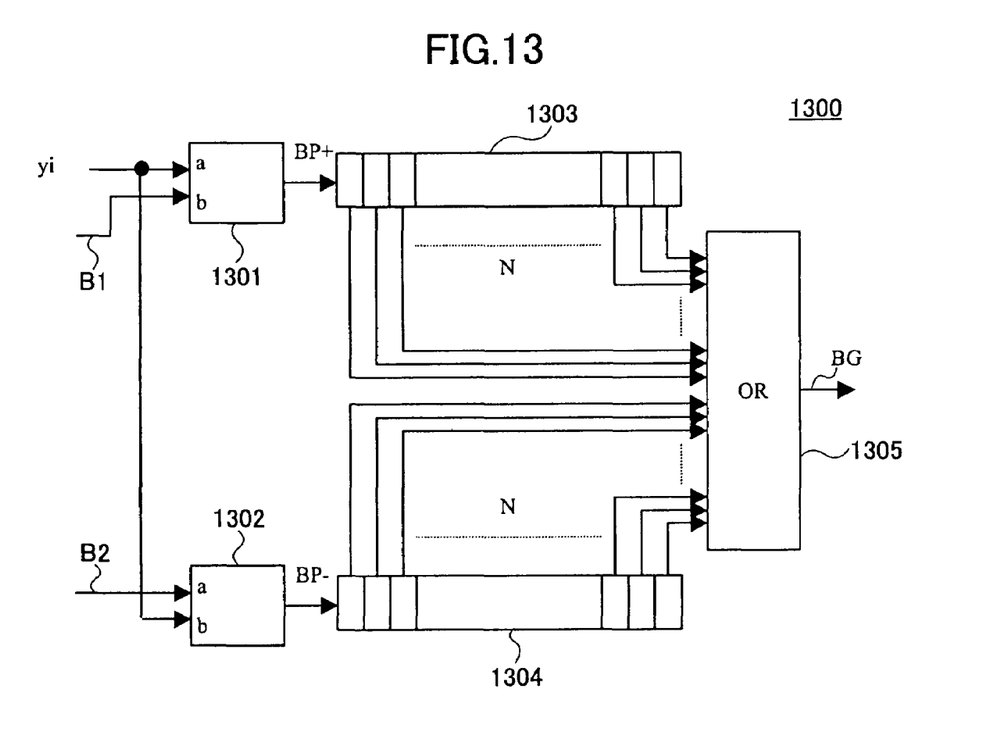
FIG. 13 is a block diagram showing one embodiment of a burst error detector of the present invention.
Figure 14:
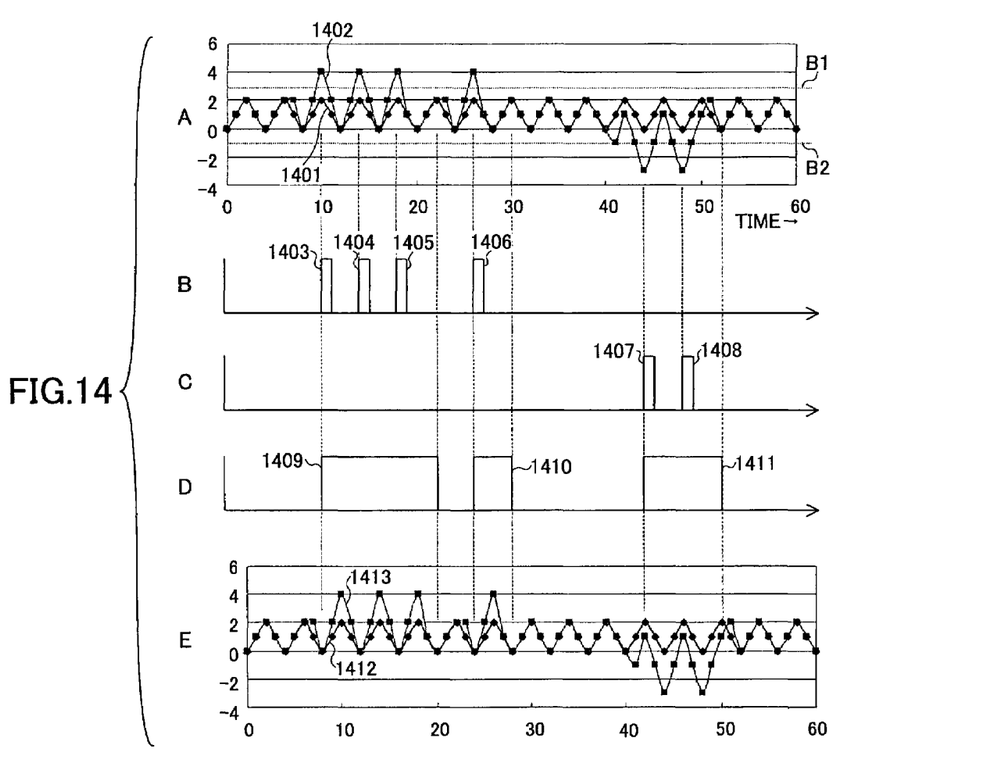
FIG. 14 is a timing diagram for explaining the operation of the burst error detector of the present invention.

Next, by referring to FIGS. 13 and 14, a description will be given of one embodiment of the burst error detector of the present invention. FIG. 13 shows the embodiment of a burst error detector 1300 as burst detecting means of the present invention. FIG. 14 is a timing diagram for explaining the operation of the burst error detector 1300 of the present invention.

FIG. 13 shows the embodiment of the burst error detector 1300. The burst error detector 1300 includes comparators 1301 and 1302, shift registers 1303 and 1304, and an OR circuit 1305. Each of the comparators 1301 and 1302 includes an input a and an input b, and it is assumed that when a is equal to or greater than b, the output is at a high level, and when a<b, the output is at a low level. The comparator 1301 compares the sampling value yi with B1 shown in FIG. 10-A, and determines whether the sampling value yi is in a burst error part. The comparator 1302 compares the sampling value yi with B2 shown in FIG. 10-A, and determines whether the sampling value yi is in a burst error part. The output of the two comparators 1301 and 1302 are input to the N-stage shift registers 1303 and 1304, respectively, which represent a burst error position. All output of each of the shift registers 1303 and 1304 is input to the OR circuit 1305.

The output of the OR circuit 1305 is a burst error gate signal (BG), that is, the burst error period T in FIG. 10-A. However, when the sampling value yi is delayed for N/2 stages of the shift register in a shifting circuit such as the shifting circuit 402 shown in FIG. 5, the BG is opened before N/2 of the BP. Thus, it is possible to deal with even the small influence of a burst error occurring in the hem (tail ends) of a Gaussian distribution of an optical beam due to dust and scratches.

FIG. 14 shows the operation of the burst error detector 1300. FIG. 14-A shows the sampling values obtained by sampling a signal 1401 that does not include a burst error part in reproduction data, and the sampling values obtained by sampling a signal 1402 that includes a burst error part in reproduction data.

As explained by referring to FIG. 13, the burst error detector 1300 determines that yi is at the burst error position BP when yi is greater than the threshold value B1 on the positive side of the burst error detection level, or when yi is smaller than the threshold value B2 on the negative side of the burst error detection level.

In this embodiment shown in FIG. 14, the case is shown where the number of stages of the shift registers 1303 and 1304 shown in FIG. 13 is, for example, N=4. As indicated by FIG. 14-B, when yi is greater than the threshold value B1 on the positive side of the burst error detection level, the outputs of the shift register 1303 are high levels 1403 through 1406. On the other hand, as indicated by FIG. 14-C, when yi is smaller than the threshold value B2 on the negative side of the burst error detection level, the outputs of the shift register 1304 are high levels 1407 and 1408. When all of the outputs of the N stages of each of the shift registers 1303 and 1304 are input to the OR circuit 1305, as indicated by FIG. 14-D, a signal comprising high levels 1409 through 1411 in the burst error periods is obtained as the output of the OR circuit 1305. In this manner, it is possible to generate the burst error gate signal BG having a time period of the intervals under the influence of the burst error.

As described above, by supplying the burst error signal generated by the burst error detector 1300 to a substituting circuit as substituting means such as the substituting circuit 402 shown in FIG. 5, it is possible to replace the burst error part with a predetermined signal or by an operation.

In addition, FIG. 14-E indicates sampling values 1412 obtained by delaying, for N/2=2 clocks in the substituting circuit, the signal 1401 that does not include the burst error part in the reproduction data, and sampling values 1413 obtained by delaying, for N/2=2 clocks in the substituting circuit, the signal 1402 that includes the burst error part in the reproduction data. In this manner, by delaying the sampling value yi for N/2 stages in the substituting circuit with respect to the burst error gate signal BG generated by the burst error detector 1300, it is also possible to substitute the predetermined signal or by an operation, for the sampling value yi under the influence of the burst error part in a part before the burst error position BP.

As described above, according to the present invention, by detecting a burst error part and substituting for the burst error part a value that does not affect parts other than the burst error part, it is possible to control the influence of wrong likelihood information in iterative decoding. Accordingly, it is possible to maintain the decoding ability of iterative decoding.

In addition, according to the present invention, wrong likelihood information is not propagated even if a reproduction signal includes a burst error part. Hence, it is possible to obtain a recording/reproducing apparatus having high decoding ability even with low S/N ratios by iterative decoding.

The present invention is not limited to the specifically disclosed embodiments, and variations and modifications may be made without departing from the scope of the present invention.

The present application is based on Japanese priority application No. 2002-246841 filed on Aug. 27, 2002, the entire contents of which are hereby incorporated by reference.

What is claimed is:

1. A recording/reproducing apparatus that records and reproduces, over a partial response channel, a recording signal produced by encoding data according to a convolutional code and reproduces the data from a reproduction signal by iterative decoding using likelihood information, said recording/reproducing apparatus comprising:

a burst error detector detecting a burst error part in the reproduction signal; and a substituting part substituting, for a sampling value included in the burst error part, a predetermined value according to a detected result of said burst error detector, wherein the predetermined value is a value by which influence of the sampling value in the burst error part is not propagated, when performing the iterative decoding of the data by using likelihood information of a sample in a part other than the burst error part.

2. The recording/reproducing apparatus as claimed in claim 1, wherein the predetermined value is one of a sampling value and a likelihood information value with which a probability that a data value obtained through the iterative decoding is "0" and a probability that a data value obtained through the iterative decoding is "1" become the same.

3. The recording/reproducing apparatus as claimed in claim 2, wherein the likelihood information is a value corresponding to data output from the partial response channel.

4. The recording/reproducing apparatus as claimed in claim 2, wherein the likelihood information corresponds to data output through decoding of the convolutional code.

5. The recording/reproducing apparatus as claimed in claim 1, wherein the burst error detector determines that a sample is included in the burst error part in one of the case wherein the sampling value is greater than a first detection level and the case wherein the sampling value is smaller than a second detection level, where the first detection level is higher than the second detection level.

6. The recording/reproducing apparatus as claimed in claim 1, wherein the substituting part substitutes, after delaying the sampling value, the predetermined value for the sampling value according to a detected result of the burst error detector.

7. The recording/reproducing apparatus as claimed in claim 1, wherein the substituting part controls whether or not to substitute for the sampling value in accordance with the number of times of iteration of the iterative decoding.

8. The recording/reproducing apparatus as claimed in claim 1, wherein a predetermined operation reduces an amplitude of a signal of the sampling value including the burst error part.

9. The recording/reproducing apparatus as claimed in claim 1, wherein the substituting part substitutes, after delaying the sampling value, for the sampling value through a predetermined operation according to a detected result of the burst error detector.

10. A method of substituting for a burst error part in a reproduction signal reproduced by a recording/reproducing apparatus that records and reproduces, over a partial response channel, a recording signal produced by encoding data according to a convolutional code and reproduces the data from the reproduction signal by iterative decoding using likelihood information, said method comprising:

detecting the burst error part in the reproduction signal; and substituting, for a sampling value included in the burst error part, a predetermined value according to a detected result of the detecting the burst error part, wherein the predetermined value is a value by which influence of the sampling value in the burst error part is not propagated, when performing the iterative decoding of the data by using likelihood information of a sample in a part other than the burst error part.

11. The method as claimed in claim 10, wherein the predetermined value is one of a sampling value and a likelihood information value with which a probability that a data value obtained through the iterative decoding is "0" and a probability that a data value obtained through the iterative decoding is "1" become the same.

* * * * *